United States Patent [19]
Bertolasi

[11] 3,938,611
[45] Feb. 17, 1976

[54] INTAKE MANIFOLD VALVE THROTTLE CONTROL FOR SPIN CONTROL SYSTEM

[75] Inventor: Robert B. Bertolasi, Rockford, Ill.

[73] Assignee: Kelsey-Hayes Company, Romulus, Mich.

[22] Filed: Nov. 23, 1973

[21] Appl. No.: 418,557

[52] U.S. Cl............ 180/77 R; 180/82 R; 123/106; 123/102
[51] Int. Cl.².......................................... B60K 31/00
[58] Field of Search ............ 180/77 R, 82 R, 105 E; 123/124 B, 102, 106; 303/21 EB

[56] References Cited
UNITED STATES PATENTS

| | | | |
|---|---|---|---|
| 696,903 | 4/1902 | Hennegin ............................ | 123/106 |
| 2,040,418 | 5/1936 | Williams ............................. | 180/77 R |
| 2,433,205 | 12/1947 | Decker ............................... | 123/124 B |
| 2,509,755 | 5/1950 | Baldine .............................. | 123/124 B |
| 3,060,602 | 10/1962 | Buttenhoff ......................... | 180/105 E |
| 3,250,264 | 5/1966 | Bartholomew .................... | 180/77 R |
| 3,752,249 | 8/1973 | Gelenius et al. ................... | 303/21 EB X |
| 3,776,355 | 12/1973 | Scherenberg ..................... | 180/77 R |
| 3,776,357 | 12/1973 | Arai et al. .......................... | 180/77 R X |

*Primary Examiner*—Leo Friaglia
*Attorney, Agent, or Firm*—Harness, Dickey & Pierce

[57] ABSTRACT

A novel spin control system for an engine-driven wheeled vehicle for reducing the power applied to driven wheels of the vehicle when an incipient wheel spin is detected. A normally closed electrically-actuated intake manifold valve is mounted on the intake manifold of the engine for actuation to an open position by an electronic circuit which detects an incipient wheel spin via wheel speed sensors. With the intake manifold vented to atmosphere via the open intake manifold valve, engine intake manifold vacuum drops automatically throttling down the engine irrespective of the carburetor throttle position to reduce the power input to the spinning wheel or wheels thereby effectively counteracting the incipient spin condition.

17 Claims, 4 Drawing Figures

INTAKE MANIFOLD VALVE THROTTLE CONTROL FOR SPIN CONTROL SYSTEM

BACKGROUND AND SUMMARY OF THE INVENTION

The present invention relates to spin control systems for vehicles generally and more particularly to a novel spin control system for an engine-driven, multi-wheeled vehicle.

Generally speaking, wheel spin in a driven wheel of a vehicle, such as an automobile, truck, or the like, is an undesirable condition. Accordingly, it is typically desirable to counteract the spin condition while in its incipiency before the spinning wheel can accelerate to a very high rotational velocity. Heretofore, various types of spin control systems have been proposed and developed.

The present invention is directed to improvements in spin control systems and provides a spin control system which is readily adaptable to virtually all currently manufactured vehicles with a minimum of revision to existing components in those vehicles. The present invention is especially well suited to mass production application, and results in a minimum addition to the vehicle cost while providing important advantages when the vehicle is in use. In the preferred embodiment of the spin control system according to the present invention, incipient wheel spin at one of the driven rear wheels of the vehicle is detected by comparing the average rotational speed of the rear wheels with the rotational speed of a free-running, or undriven, front wheel of the vehicle. The respective speed signals are provided by respective wheel speed sensors. When the average speed of the driven wheels exceeds the speed of the free-running wheel by a predetermined amount, thereby indicating that one or both of the driven wheels are in an incipient spin condition, an electronic circuit to which the wheel speed sensors are coupled develops a spin signal indicative of the incipient spin condition. A normally closed solenoid-actuated valve is mounted on the intake manifold of the engine and is arranged to open in response to the spin signal. Upon opening of the intake manifold valve, the intake manifold of the engine is vented to atmosphere. By venting the intake manifold in this fashion, intake manifold vacuum is reduced thereby reducing the flow of air-fuel mixture from the carburetor to the cylinders of the engine. Accordingly, the engine is effectively throttled down even through the carburetor throttle valve is in a position which otherwise would cause continued, or even increased, air-fuel mixture to be supplied to the engine cylinders. In turn, the power input to the incipiently spinning wheel is reduced. Thus, the spin control system of the present invention provides automatic spin control of the driven wheels of the vehicle thereby eliminating wheel spin and attendant adverse consequences thereof.

Other features and advantages of the present invention along with the aforementioned features and advantages will be seen in the ensuing description and claims which are to be taken in conjunction with the accompanying drawings.

BRIEF DESCRIPTION OF THE DRAWINGS

The drawings illustrate a preferred embodiment of the invention in accordance with the best mode presently contemplated for carrying out the invention.

DESCRIPTION OF THE PREFERRED EMBODIMENT

Figure 1:
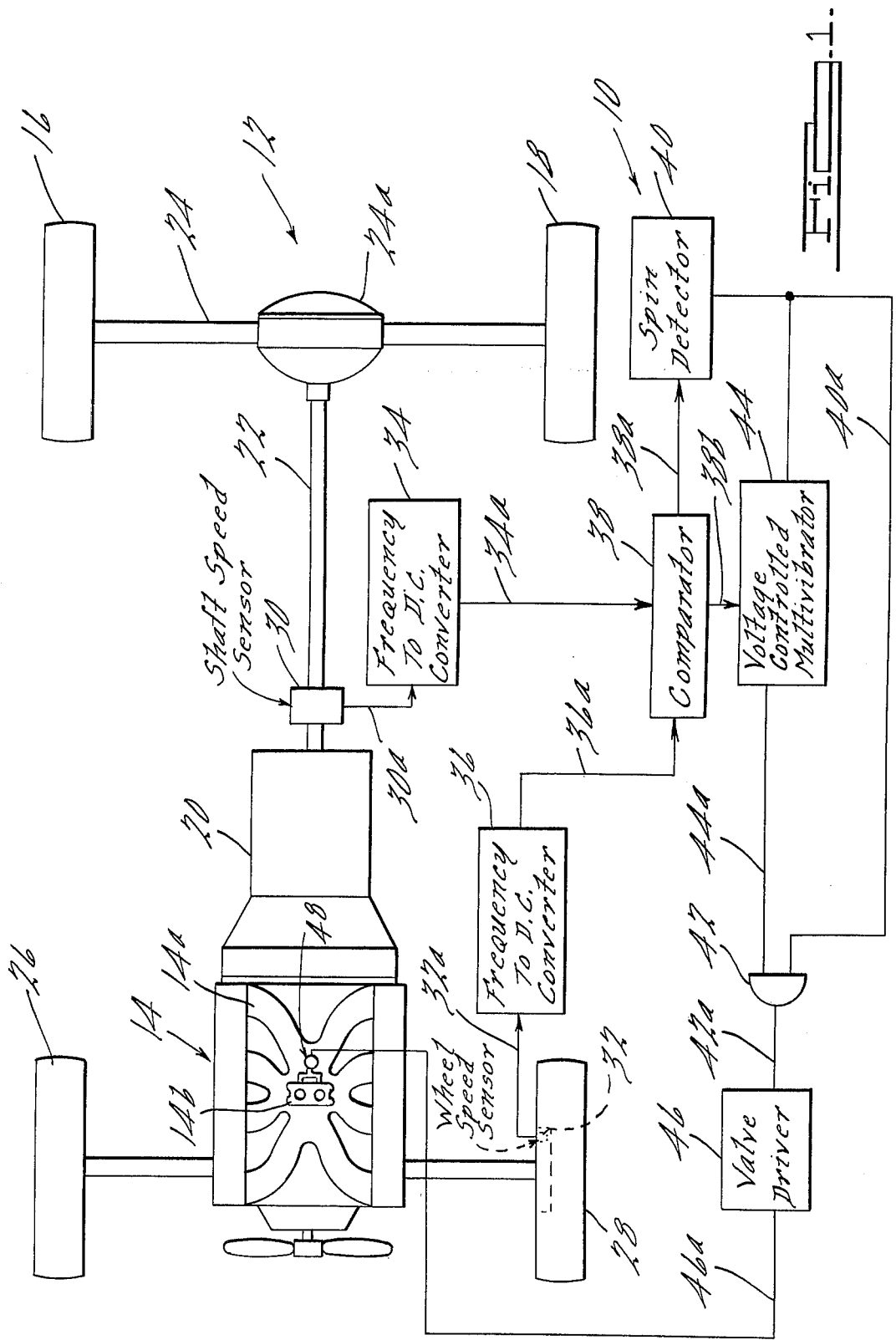
FIG. 1 is a schematic diagram of a vehicle chassis system including, in block diagram form, a spin control system embodying principles of the present invention.

FIG. 1 illustrates in block diagram form an exemplary preferred embodiment of spin control system 10 according to the present invention in use with a conventional automotive vehicle chassis 12 diagramatically illustrated. The vehicle chassis 12 includes a multi-cylinder internal combustion gasoline engine 14 which drives rear wheels 16 and 18 via a transmission 20, a driveshaft 22, and a rear axle 24 on which rear wheels 16 and 18 are mounted. The vehicle chassis 12 further includes undriven, steerable front wheels 26 and 28. Although in its broadest aspect the invention may be used to detect and respond to an incipient spin condition at any wheel of a vehicle, the illustrated embodiment operates to detect and counteract an incipient spin at either rear wheel 16 or 18. Rear axle 24 has a differential 24a which under normal driving conditions permits both rear wheels 16 and 18 to be simultaneously powered from engine 14 yet which compensates for different rear wheel rotational velocities when the vehicle is in a turn. However, conventional differentials, such as are used in most currently manufactured vehicles, prevent the engine from powering the vehicle if either one of the driven rear wheels loses traction with the surface over which it is traveling. Hence, if one of the rear wheels 16, 18 should lose traction, the road load torque imposed on engine 14 suddenly drops and the engine suddenly accelerates. The sudden engine acceleration is transmitted via transmission 20, driveshaft 22, and differential 24a to the rear wheel which has lost traction thereby causing that wheel to accelerate into a spin. With one of the rear wheels spinning, rear axle 24 cannot transmit sufficient torque to the non-spinning rear wheel to power the vehicle. If both rear wheels lose road traction, then both are accelerated into spins. The net result is that an extremely high wheel rotational speed at the spinning wheel or wheels can occur before the vehicle operator has time to release the throttle, and the engine has time to respond. Needless to say, this can result in a waste of fuel as well as needless wear and tear on the associated chassis components. Further, where the vehicle is traveling along the road and encounters a slippery spot resulting in rear wheel spin, the spin can be potentially dangerous and may result in loss of control after the spinning wheel leaves the slippery spot.

The spin control system 10 according to the present invention detects an incipient spin at either or both rear wheels 16, 18 and operates to quickly automatically throttle down the engine thereby reducing the power input to the engine to counteract engine acceleration and rear wheel spin. One advantageous way of detecting incipient wheel spin at either or both rear wheels is to compare the speed of driveshaft 22 with the speed of one of the undriven front wheels 26, 28. A shaft speed sensor 30 senses the rotational speed of driveshaft 22, and provides an electronic waveform whose frequency is representative of the rotational speed of driveshaft 22. Sensor 30 is of known construction; for example, a sensor of the type disclosed in applicant's co-pending application Ser. No. 362,334 filed May 21, 1973, is especially suitable.

Thus, if either or both rear wheels lose road traction and begin to spin, then the speed of driveshaft 22 increases. The rotational speed of driveshaft 22 represents an average of the speeds of rear wheels 16 and 18. Another wheel speed sensor 32 is arranged to provide an electronic waveform whose frequency is representative of the speed of one of the front wheels; for example, the left front wheel 28. Frequency to DC converters 34 and 36, which are of conventional construction, are respectively coupled with sensors 30 and 32 respectively, via connections 30a and 32a, respectively. Converter 36 converts the signal from sensor 32 into a DC output signal whose magnitude is representative of the speed of front wheel 28. Converter 34 converts the signal from sensor 30 into a DC output signal whose magnitude is representative of the speed of driveshaft 22 (i.e., the average speed of rear wheels 16 and 18). One advantage of this technique for detecting wheel spin is that only two speed sensors are required to sense wheel spin at either or both rear wheels. The respective DC output signals from converters 34 and 36 are supplied via respective connections 34a, 36a to a comparator circuit 38. Comparator 38 compares the magnitudes of the respective signals from converters 34, 36 and provides output signals via connections 38a, 38b whose magnitudes are proportional to the magnitude of the difference between the signals supplied from the respective converters 34, 36. When the magnitude of the difference between the signals from converters 34 and 36 achieves a preselected magnitude, the respective comparator output signals at connections 38a and 38b reach maximum values and remain at these maximum values for all magnitudes of difference between the signals from the converters 34 and 36 greater than the preselected magnitude. The comparator output signals, however, reach maximum value upon a very small difference between the magnitudes of the signals from converters 34, 36 and this is representative of a preselected minimum amount of wheel spin to which the system 10 will respond. Comparator 38 is preferably uni-directional, i.e., the comparator responds only when the magnitude of the signal from converter 34 exceeds the magnitude of the signal from converter 36. Consequently, the comparator provides output signals which are logically related only to rear wheel spin and not to rear wheel skid.

A spin detector circuit 40 receives the output signal from comparator 38 via connection 38a. Spin detector 40 supplies an output signal via connection 40a to one input of an and gate 42 when the signal supplied from comparator 38 to spin detector 40 exceeds a relatively small threshold value indicative of a very small magnitude of difference between the signals from the respective converters 34 and 36; the output signal from comparator 38 is also supplied via connection 38b to the input of a voltage controlled multivibrator circuit 44. Multivibrator 44 also receives the output signal from spin detector 40 to enable the multivibrator. Multivibrator 44 supplies an output signal via connection 44a to the other input of AND gate 42. The output signal provided by multivibrator 44 comprises a train of pulses of fixed duration with the interval between pulses varying in duration in inverse proportion to the magnitude of the output signal supplied to multivibrator 44 from comparator 38. AND gate 42 provides via a connection 42a an output signal to a valve driver circuit 46 whenever both input signals are present at the inputs of AND gate 42. AND gate 42 serves as an interlock function assuring that a control signal to valve driver 46 will not be provided unless spin detector 40 provides a signal indicating that an incipient spin has been detected. The output of valve driver 46 is coupled via a connection 46a with a normally closed, electrically actuated intake manifold valve 48 mounted on the intake manifold 14a of engine 14. Valve 48 is arranged to open in response to the occurrence of output pulses supplied from valve driver 46. Opening of valve 48 vents the intake manifold to atmosphere, either directly or through an air filter (not shown), and as a result engine vacuum at the intake manifold is suddenly reduced. The reduction of engine vacuum reduces the flow rate of air-fuel mixture into engine from carburetor, preferably substantially arresting the flow of fuel to the engine cylinders. (Note that the carburetor is omitted from FIG. 1 of the drawing although the carburetor mounting flange 14b is shown.) Normally, when a rear wheel loses traction, the carburetor throttle valve is in a position other than its idle position, and this tends to spin the wheel into a rapid acceleration toward a relatively high spinning speed. By detecting the incipient skid condition and immediately actuating intake manifold valve 48, the present invention in effect automatically throttles down the engine to counteract the spin. In this way, wheel spins, which can be damaging to the tire and chassis components as well as being wasteful of gasoline, are avoided.

Figure 2:
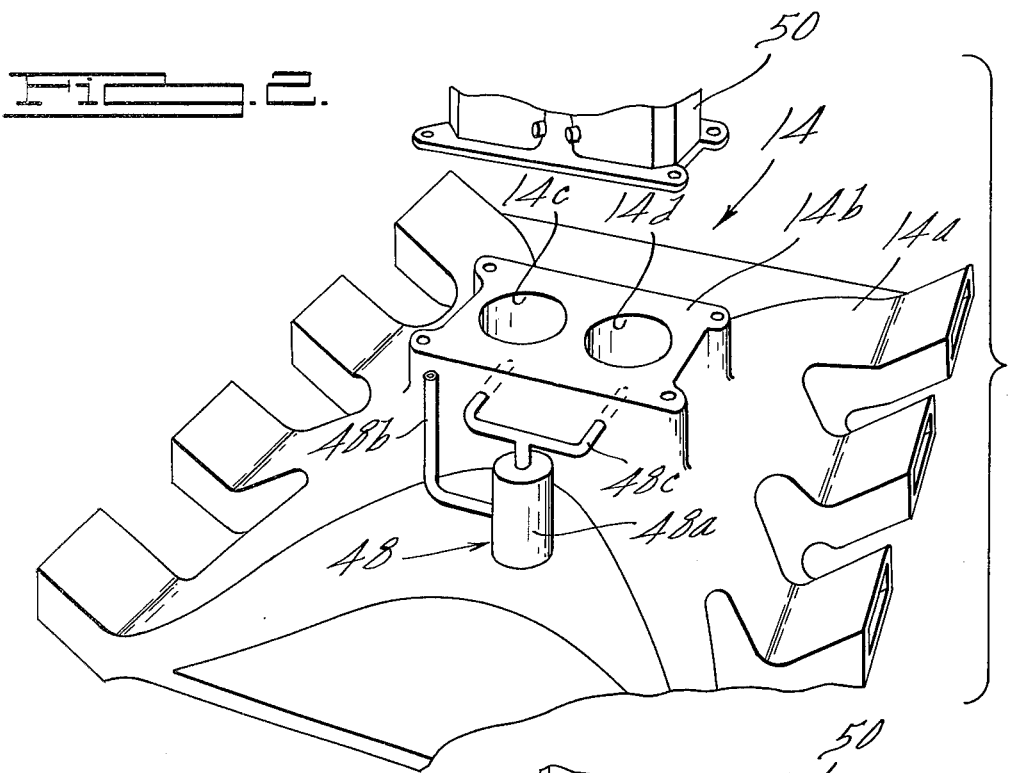
FIG. 2 is a perspective view of a vehicle engine illustrating one possible arrangement for mounting the intake manifold valve on the engine intake manifold.
Figure 3:
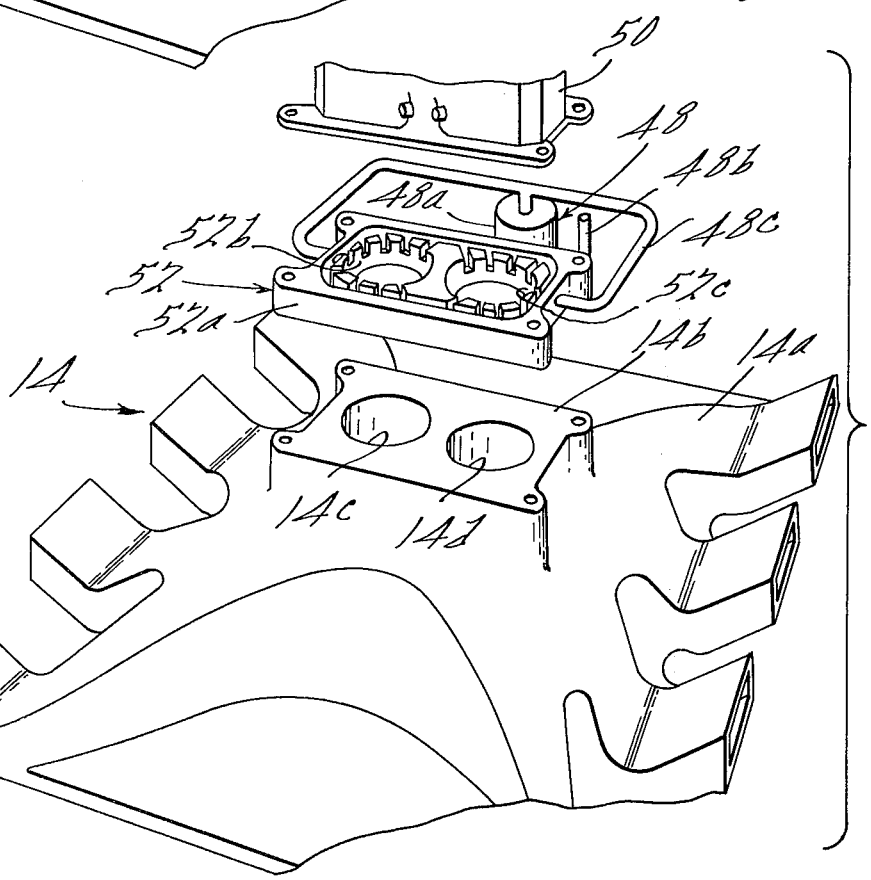
FIG. 3 is a perspective view similar to FIG. 2 illustrating another arrangement for mounting the intake manifold valve.

FIGS. 2 and 3 illustrate possible ways of mounting valve 48 on engine 14. In FIG. 2 (which illustrates the carburetor 50 exploded away from the carburetor mounting flange 14b) valve 48 mounts on the engine directly on the carburetor mounting flange 14b. The valve body 48a is positioned in a recess defined by intake manifold 14a and the valve inlet pipe 48b projects upwardly away from the valve body 48a as illustrated. The valve outlet pipe 48c tees into carburetor mounting flange 14b to intersect the two air-fuel mixtures inlet ports 14c and 14d in intake manifold 14a. With this arrangement, when valve 48 is energized (via leads not shown) intake manifold 14b is vented to atmosphere with air being drawn through inlet pipe 48b, valve body 48a, outlet pipe 48c to enter the intake manifold via inlet ports 14c and 14d. Consequently, engine vacuum suddenly drops. The carburetor throttle valve which is upstream of the points at which outlet pipe 48c intercepts ports 14c and 14d now tends to lose control of the amount of air-fuel mixture entering the engine with the engine in effect being automatically throttled down to counteract the spin. Engine stalling is automatically avoided, however, since the carburetor throttle valve will regain control as soon as valve 48 closes and valve 48 closes after the spin has been counteracted and before engine stalling can occur.

FIG. 3 illustrates (in exploded form) another arrangement for mounting valve 48 on engine 14. This arrangement does not require the modification to the existing intake manifold as was required by providing the passages in the carburetor mounting flange in FIG. 2. In FIG. 3 valve 48 is part of an adapter plate assembly 52 which mounts between carburetor 50 and mounting flange 14b. Adapter plate assembly 52 includes an adapter plate 52a which is interposed directly between carburetor mounting flange 14b and carburetor 50 and includes bores 52b, 52c which are in alignment with the inlet ports 14c and 14d and with the barrels of the carburetor 50. The outlet pipe 48c from valve body 48 is arranged to intersect bores 52b, 52c in adapter plate 52a. Thus, the arrangement shown in FIG. 3 is especially well suited for vehicles since modification to the intake manifold itself is not required. The arrangement in FIG. 3 operates in the same manner described above in FIG. 2.

Figure 4:
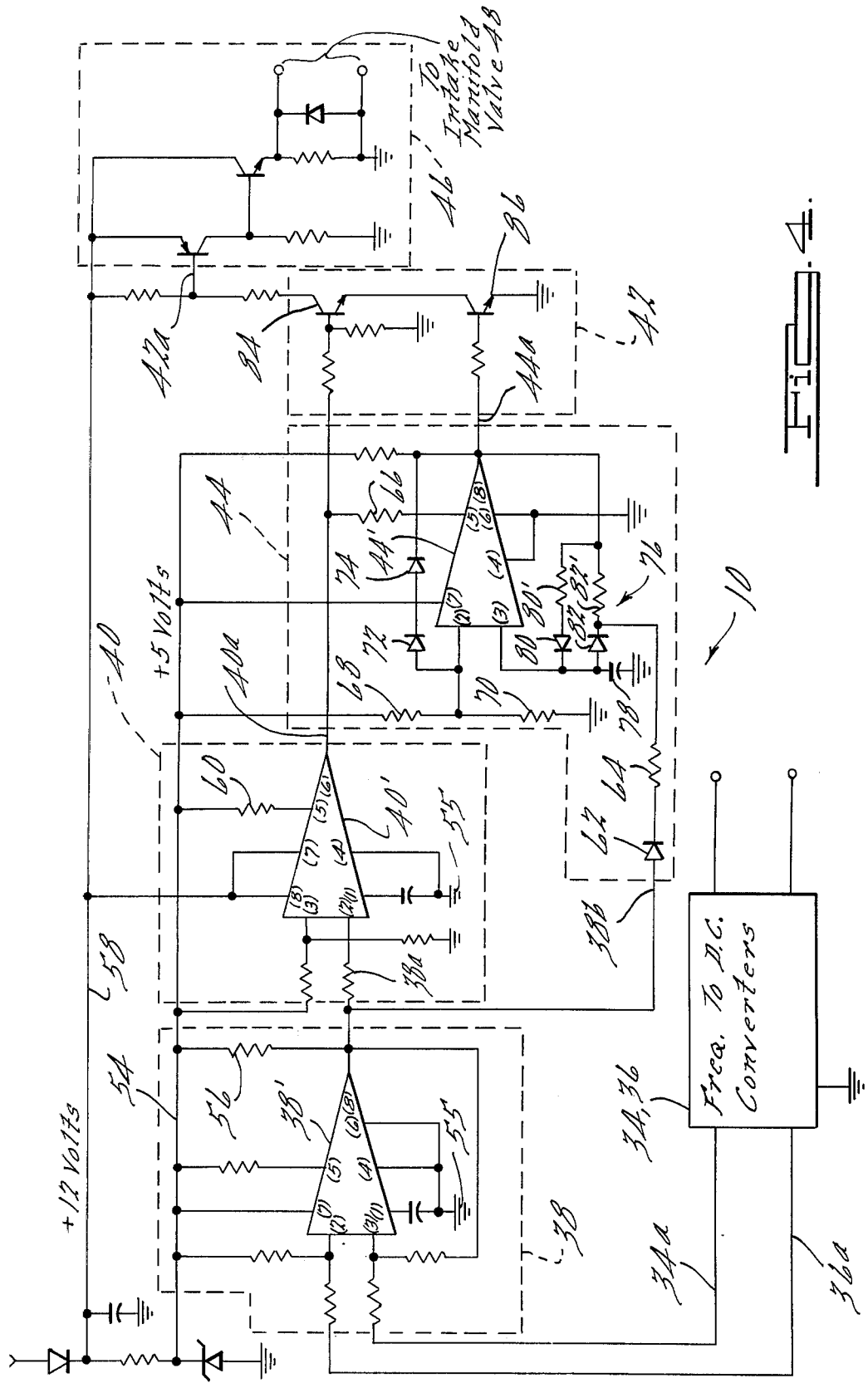
FIG. 4 is an electrical schematic diagram illustrating in further detail a spin control system embodying principles of the present invention.

In FIG. 4 a detailed electronic circuit diagram of an exemplary spin control system 10 is illustrated. The electronic circuit is generally similar to that disclosed in applicant's co-pending application Ser. No. 362,334 filed May 21, 1973, assigned to the same assignee as the present application. The disclosure of said co-pending application is incorporated herein by reference. The frequency to DC converters 34, 36 are designated by the single block 34, 36 in FIG. 4, and the connections 43a, 36a connect to the input terminals of comparator 38. In the illustrated embodiment, comparator 38 comprises an integrated circuit module 38', Model No. CA 3094 T, available from the Radio Corporation of America, Solid State Division, Somerville, N.J.; the terminal designations of module 38' which are indicated in parentheses in the drawing figure correspond to the manufacturer's terminal designations. The signal from converter 34 (i.e., the average rear wheel speed signal) is supplied via connection 34a to the subtracting terminal (3) of module 38', and the signal from converter 36 (i.e., the left front wheel speed signal) is supplied via connection 36 to the adding terminal (2) of module 38'. Module 38' has an emitter terminal (6) connected to ground and a collector terminal (8) connected via output connections 38a, 38b to spin detector 40 and multivibrator 44. The remaining terminals of module 38' are connected as illustrated via the illustrated connections to either a +5 volt lower voltage supply line 54 or to ground 55. With the illustrated connection of module 38', the signal at collector terminal (8) is held at +5 volts by a connection through a resistor 56 to lower voltage supply line 54 so long as the magnitude of the signal at adding terminal (2) equals or exceeds the magnitude of the signal at subtracting terminal (3). However, when the magnitude of the signal at subtracting terminal (3) begins to exceed the magnitude of the signal at adding terminal (2), then terminal (8) acts as a current sink with the potential at terminal (8) being pulled down from the +5 volt level in an amount corresponding to the amount by which the magnitude of the signal at terminal (3) exceeds the magnitude of the signal at terminal (2). In this way, comparator 38 operates to provide a +5 volt signal to spin detector 40 and to multivibrator 44 so long as the speed of the left front wheel is equal to or exceeds the average rear wheel speed; when the average rear wheel speed begins to exceed the speed of the left front wheel, the output signal from comparator 38 becomes correspondingly less positive.

Spin detector circuit 40 comprises an integrated circuit module 40' also a Model CA 3094 T. Terminals (1) and (4) of module 40' connect to ground as illustrated; terminals (8) and (7) connect as illustrated to a +12 volt higher voltage supply line 58; terminal (5) connects through a resistor 60 to the lower voltage supply line 54; and terminal (6) connects via connection 40a to and gate 42. The one output signal from comparator 38 is supplied via connection 38a to adding terminal (2) of module 40'. A voltage divider circuit composed of two resistors connected between supply line 54 and ground 55 provides to subtracting terminal (3) of module 40' a fixed percentage of the +5 volt reference potential. This voltage dividing circuit trims module 40' so that spin detector 40 cannot supply an output signal until the output from comparator 38 falls slightly below +5 volts. With this particular circuit construction for spin detector 40, the spin detector provides a positive output signal at terminal (6) when the output signal from comparator 38 drops from its +5 volt reference level to a predetermined level lower than the +5 volt reference level. In this way, spin detector provides an output signal only when an incipient wheel spin is detected.

Voltage controlled multivibrator 44 incorporates an integrated circuit module 44' of the same model identified above and receives via connection 38b the output signal from comparator 38, connection 38b including a diode 62 and a resistor 64. The terminals of modules 44' are connected as illustrated with terminal (5) of module 44' being connected through a resistor 66 to the output terminal (6) of module 40'. Module 44' receives a reference voltage at its adding terminal (2) by virtue of the voltage divider composed of resistors 68 and 70 connected across the +5 volt reference supply 54. This voltage divider provides approximately 50 percent voltage reduction. Terminals (4) and (6) of module 44' connect to ground; terminal (7) connects to supply line 54; an enabling signal is received at terminal (5) when spin detector 40 provides a positive output signal indicating an incipient wheel spin. Multivibrator 44 provides a train of positive square wave output pulses at terminal (8) and these are transmitted via connection 44a to and gate 42. During an output pulse the voltage at terminal (8) is high and the reference voltage at terminal (2) of module 44' remains undisturbed (i.e., remains at approximately +2.5 volts). When the output at terminal (8) is low (i.e., between output pulses), the reference voltage at terminal (2) is clamped to two diode drops above the low level by diodes 72, 74 which connect between terminal (2) and terminal (8). A control circuit 76 operatively couples the input connection 38b with both subtracting terminal (3) and collector terminal (8) of module 44'. The control circuit 76 includes a capacitor 78, a capacitor charging diode 80, and a capacitor discharge diode 82. The diodes 80 and 82 are oppositely poled in shunt with each other through respective resistors 80', 82' and connect between the positive terminal of capacitor 78 and collector terminal (8) of module 44'. The positive capacitor terminal 78 connects to subtracting terminal (3) of module 44' and the other terminal of capacitor 78 is grounded. Connection 38b connects through diode 62 and resistor 64 to the junction of diode 82 and resistor 82'. The illustrated arrangement operates such that output terminal (8) of module 44' acts as a current sink whenever the signal at subtracting terminal (3) exceeds the magnitude of the signal at adding terminal (2). Thus, when the signal at terminal (8) is high, capacitor 78 is positively charged via diode 80. This causes the magnitude of the signal supplied to subtracting terminal (3) to increase. When the magnitude of the signal supplied to subtracting terminal (3) exceeds the magnitude of the reference signal at adding terminal (2), the output at terminal (8) goes low thereby terminating the output pulse. The signal at terminal (2) is now clamped to two diode drops above the magnitude of the output signal at terminal (8). With the output signal at terminal (8) low, capacitor 78 begins to discharge via diode 82. The discharge rate of capacitor 78 is, however, determined by the magnitude of the output signal supplied from comparator 38 via connection 38b. For a more positive level of output signal from circuit 38, an increased amount of current flow passes through connection 38b through resistor 82' to collector terminal of module 44'. Hence, the effective resistance seen by capacitor 78 is increased thereby reducing the capacitor discharge rate. Accordingly, it will be appreciated that the discharge rate of capacitor 78 increases as the magnitude of the output signal from comparator 38 decreases, and vice versa. Hence, multivibrator 44 provides constant duration output pulses and a duration between output pulses which is inversely proportional to the difference between the speed of the left front wheel and the average speed of the rear wheels. Therefore, for greater amounts of wheel spin of the rear wheels relative to the front wheel, the frequency of the output signal from multivibrator 44 correspondingly increases. Once capacitor 78 discharges below the two diode voltage drops applied to terminal (2) the output of module 44' again goes high (i.e., provides the next output pulse) and the +2.5 volt reference level is reapplied to terminal (2).

And gate 42 comprises a pair of transistors 84, 86 whose emitter-collector circuits are connected in series with each other. The base circuit of transistor 84 connects via connection 40a with spin detector 40 while the base circuit of transistor 86 connects via connection 44a with multivibrator 44. With this arrangement, and gate 42 provides via connection 42a a square wave output signal to valve driver 46 only when spin detector 40 is supplying a positive output signal indicating a spin condition and multivibrator 44 is providing output pulses. The square wave output of and gate 42 corresponds to the frequency of multivibrator 44. Valve driver 46 comprises a two-stage driver circuit which drives valve 48 via the pulses received from and gate 42, a drive pulse being supplied to valve 48 concurrently with each pulse from multivibrator 44. The amount of opening of valve 48 can be proportional to the frequency of the signal supplied thereto over a limited range of speed difference between the speed of the front wheel and the average speed of the rear wheels. Hence, when the average rear wheel speed exceeds the front wheel speed by less than a predetermined speed (as an example, 5 miles per hour as will be explained), valve 48 is less than fully open, when the difference exceeds 5 miles per hour, valve 48 is fully open. An advantage of this arrangement is that once valve 48 has fully opened to counteract the spin and the average rear wheel speed comes within 5 miles per hour of the front wheel speed, valve 48 begins to operate toward the closed position even before the average rear wheel speed has fallen to the front wheel speed. Hence, engine stalling is precluded even at low vehicle speeds since valve 48 closes before an engine stall condition is reached. In one exemplary embodiment, the response of comparator 38 was adjusted so that the output of the comparator at terminal (8) of module 38' was pulled down from +5 volts to ground as the average rear wheel speed increased from zero miles per hour to 5 miles per hour more than the speed of the left front wheel. The response of multivibrator 44 was established so that its output was nearly continuous, i.e., the interval between pulses was small, when the rear wheel speed exceeded the front wheel speed by 5 miles per hour. Under this condition, intake manifold 48 was not responsive to the short interval between pulses so that it was held fully open. As the output signal at terminal (8) of module 38' decreased from +5 volts to zero volts, valve 48 operated from fully closed to fully open with the degree of opening being proportional to the decrease in the magnitude of the signal at terminal (8) of module 38' from the +5 volt level.

While it will be apparent that the preferred embodiment of the invention disclosed is well calculated to fulfill the objects above stated, it will be appreciated that the invention is susceptible to modification, variation, and change without departing from the spirit thereof.

What is claimed is:

1. A spin control system for a multi-wheeled vehicle having one of the wheels thereof driven from a fuel-consuming engine having throttle valve means for supplying a fuel/air mixture and an intake manifold for communicating said fuel/air mixture to said engine in which a vacuum is produced when power is supplied by said engine to said one wheel for driving said one wheel, said system comprising:
   sensing means for sensing an incipient wheel spin at said one wheel and for generating a spin signal comprising a series of pulses indicative of the magnitude of said incipient spin; and
   valve means in addition to said throttle valve means communicating with said intake manifold and receiving said spin signal, said valve means being capable of venting the intake manifold of said engine in response to said spin signal to sufficiently lower the intake manifold vacuum to thereby sufficiently reduce the power supplied by said engine to said one wheel to counteract an incipient spin, said valve means reducing said engine intake manifold vacuum in accordance with said series of pulses so that the power supplied by said engine is reduced in accordance with the magnitude of said incipient spin.

2. A spin control system as claimed in claim 1 wherein said valve means is operable to open and closed positions, said valve means being operated from one of said positions to the other of said positions in response to said spin signal.

3. A spin control system as claimed in claim 2 wherein said valve means is arranged to communicate the intake manifold of the engine to atmosphere in response to said spin signal.

4. A spin control system as claimed in claim 3 wherein said pulses have a characteristic representative of the magnitude of wheel spin at least over a limited range of magnitudes of wheel spin and said valve means is operated to positions intermediate said open and closed positions in accordance with said characteristic of said pulses.

5. A spin control system as claimed in claim 4 wherein said characteristic is the frequency of said pulses.

6. A spin control system as claimed in claim 5 wherein said valve means is arranged to increasingly open as the frequency of said pulses increases.

7. A spin control system as claimed in claim 2 wherein said valve means is arranged to operate to said open position in response to said pulses.

8. A spin control system as claimed in claim 1 wherein said valve means is normally closed when said spin signal is absent and is opened when said spin signal is present.

9. A spin control system as claimed in claim 8 wherein said pulses have a characteristic which is representative of the magnitude of wheel spin and said valve means is operable over a range of open positions in accordance with said characteristic of said pulses.

10. A spin control system as claimed in claim 9 wherein said pulses are frequency modulated in accordance with the magnitude of wheel spin.

11. A spin control system as claimed in claim 10 wherein the frequency of said pulses increases in accordance with the magnitude of wheel spin and said valve means increasingly opens in accordance with the frequency of said pulses.

12. A spin control system as claimed in claim 11 wherein the maximum frequency is limited to a predetermined magnitude of wheel spin and said valve means is fully open at the maximum frequency of said pulses.

13. A spin control system for a multi-wheeled vehicle having an internal combustion engine driving at least one of the wheels thereof, said internal combustion engine having throttle valve means for supplying a fuel/air mixture and an intake manifold for communicating said fuel/air mixture to said engine in which a vacuum is existent when power is supplied by said engine to said one wheel for driving said one wheel, said spin control system comprising:
  sensing means for sensing an incipient wheel spin at said at least one wheel and for generating a spin signal comprising a periodic waveform indicative of the magnitude of said incipient spin;
  normally closed valving means in addition to said throttle valve means communicating the intake manifold of the engine to atmosphere, said valve means being capable of venting the intake manifold of said engine in response to said spin signal to sufficiently lower the intake manifold vacuum to thereby sufficiently reduce the power supplied by said engine to said one wheel to counteract an incipient spin; and
  means associated with said valving means for reducing the power supplied by said engine to said one wheel in response to an incipient spin by opening said valving means to a degree in accordance with said periodic waveform to vent the intake manifold to atmosphere in response to said spin signal and to reduce the power supplied in said engine in accordance with the magnitude of said incipient spin.

14. A spin control system as claimed in claim 13 wherein the frequency of said periodic waveform is representative of the magnitude of wheel spin and said means for opening said valving means in response to said spin signal is arranged to open said valving means an amount corresponding to the frequency of said periodic waveform.

15. A spin control system as claimed in claim 14 wherein the frequency of said periodic waveform increases in accordance with increases in the magnitude of said spin signal.

16. A spin control system as claimed in claim 15 wherein the maximum frequency of said periodic waveform is limited to a predetermined magnitude of wheel spin.

17. A spin control system for a multi-wheeled vehicle having an internal combustion engine driving at least one of the wheels thereof, said internal combustion engine having a carburetor for supplying a fuel/air mixture and an intake manifold for communicating the fuel/air mixture to said engine having a mounting flange for said carburetor and in which a vacuum is produced when power is supplied by said engine to said one wheel for driving said one wheel, said spin control system comprising:
  sensing means for sensing an incipient wheel spin at said at least one wheel and for generating a spin signal indicative of said incipient spin;
  normally closed valving means and an adapter means for said valving means which is mounted between the carburetor mounting flange of the intake manifold and the carburetor for communicating the intake manifold of the engine to atmosphere through said valving means; and
  means for reducing the power supplied by said engine to said one wheel in response to an incipient spin by opening said valving means in response to said spin signal to thereby vent the intake manifold to atmosphere in response to said spin signal.

* * * * *